(12) United States Patent
Badali et al.

(10) Patent No.: US 8,730,175 B2
(45) Date of Patent: *May 20, 2014

(54) CONTROLLING INPUT DEVICES BASED UPON DETECTED ATTITUDE OF AN ELECTRONIC DEVICE

(71) Applicant: Research In Motion Limited, Waterloo (CA)

(72) Inventors: Anthony Paul Badali, Toronto (CA); Mihal Lazaridis, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/763,571

(22) Filed: Feb. 8, 2013

(65) Prior Publication Data

US 2013/0162542 A1 Jun. 27, 2013

Related U.S. Application Data

(63) Continuation of application No. 13/295,691, filed on Nov. 14, 2011, now Pat. No. 8,400,404, which is a continuation of application No. 11/772,672, filed on Jul. 2, 2007, now Pat. No. 8,081,164.

(51) Int. Cl.
*G09G 5/00* (2006.01)

(52) U.S. Cl.
USPC ............................ 345/169; 345/156; 715/700

(58) Field of Classification Search
USPC .......................................... 345/156, 169–181
See application file for complete search history.

(56) References Cited

U.S. PATENT DOCUMENTS

| 7,202,853 | B2 | 4/2007 | Ng et al. |
| 7,218,313 | B2 * | 5/2007 | Marcus et al. ................. 345/169 |
| 7,382,353 | B2 * | 6/2008 | Grady et al. ................... 345/156 |
| 8,081,164 | B2 | 12/2011 | Badali et al. |
| 2002/0193080 | A1 | 12/2002 | Komsi et al. |
| 2003/0058215 | A1 * | 3/2003 | Yamaji et al. ................. 345/156 |

(Continued)

FOREIGN PATENT DOCUMENTS

WO 2007129140 A 11/2007

OTHER PUBLICATIONS

Extended European search report mailed Jan. 17, 2008, in corresponding European patent application No. 07111571.1.

(Continued)

*Primary Examiner* — Duc Dinh
(74) *Attorney, Agent, or Firm* — Novak Druce Connolly Bove + Quigg LLP

(57) ABSTRACT

An electronic device including a processor, input device, an informing device and a sensor is presented. The sensor can be adapted to detect the attitude of the device, wherein the sensor can be adapted to communicate data indicative of the attitude of the device to the processor. The processor can be configured to execute instructions to: compare the attitude with a predetermined attitude criteria, and disable the further processing of data received from the input device in the event that the attitude is not less than the predetermined attitude criteria for at least a predetermined period of time. The informing device can be adapted to output a notification when further processing of data from the input device is disabled, the notification indicating the further processing of data from input device is being disabled.

20 Claims, 11 Drawing Sheets

(56) References Cited

U.S. PATENT DOCUMENTS

| | | |
|---|---|---|
| 2003/0103091 A1 | 6/2003 | Wong et al. |
| 2005/0212749 A1 | 9/2005 | Marvit et al. |
| 2005/0216867 A1 | 9/2005 | Marvit et al. |
| 2006/0017692 A1 | 1/2006 | Wehrenberg et al. |
| 2006/0061555 A1 | 3/2006 | Mullen |
| 2006/0103733 A1 | 5/2006 | Grady et al. |
| 2008/0146289 A1 | 6/2008 | Korneluk et al. |

OTHER PUBLICATIONS

Notice of Allowance and Fee(s) Due mailed Jun. 25, 2008, in corresponding Canadian patent application No. 2,635,734.

Office Action mailed Jul. 14, 2010, in corresponding Canadian patent application No. 2,635,734.

Office Action mailed Aug. 16, 2011, in corresponding Canadian patent application No. 2,635,734.

* cited by examiner

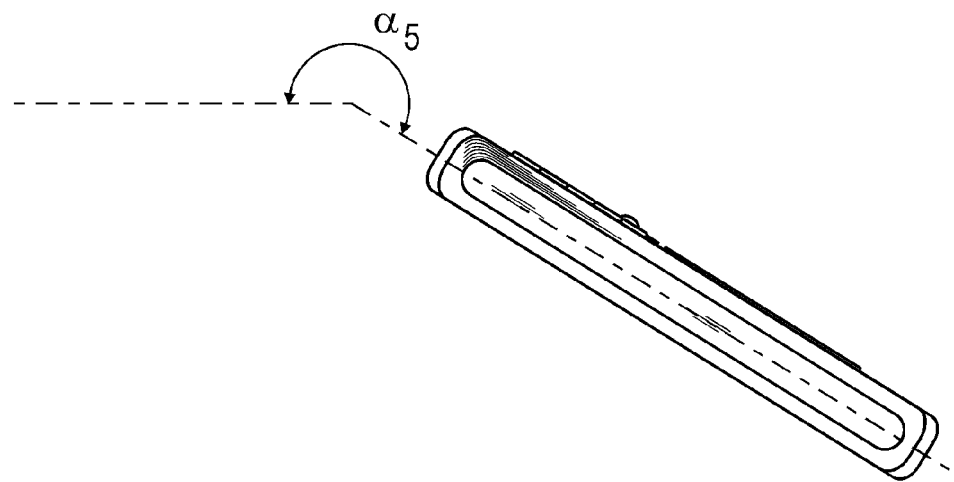
FIG. 6e
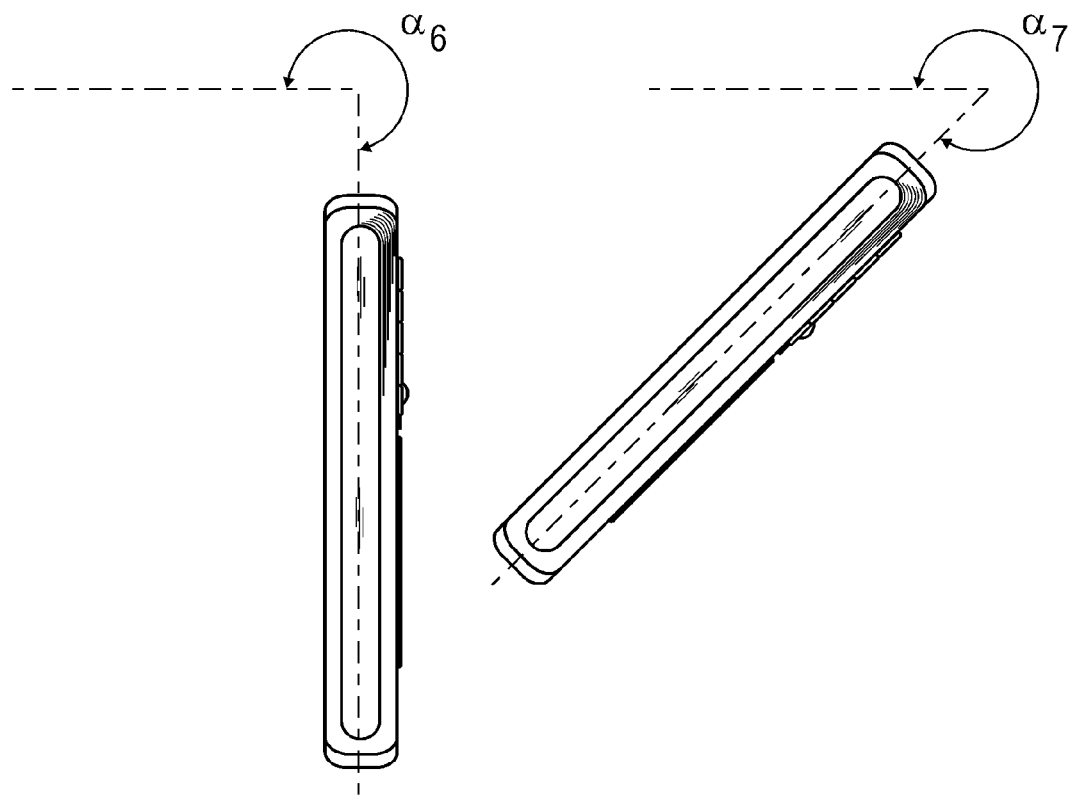
FIG. 6f  FIG. 6g

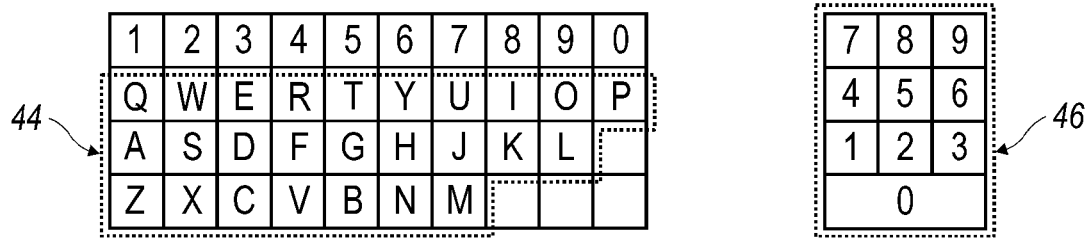
FIG. 8
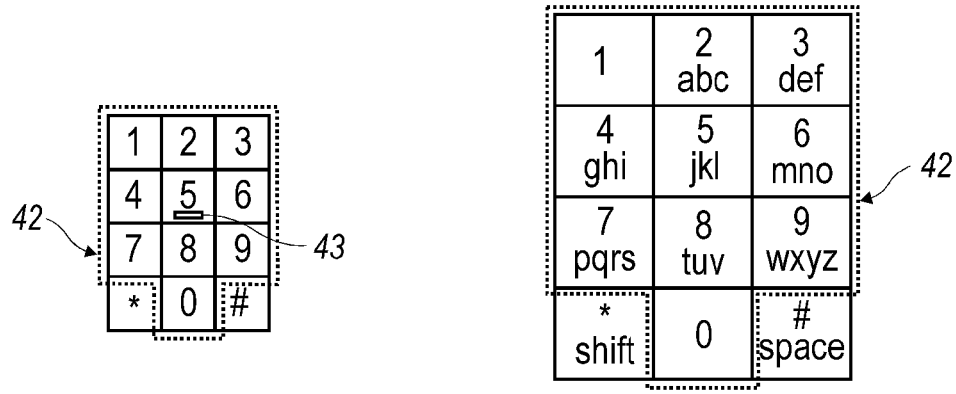
FIG. 9     FIG. 10

CONTROLLING INPUT DEVICES BASED UPON DETECTED ATTITUDE OF AN ELECTRONIC DEVICE

CROSS-REFERENCE TO RELATED APPLICATIONS

This application is a continuation of U.S. application Ser. No. 13/295,691, filed on Nov. 14, 2011, which issued as U.S. Pat. No. 8,400,404 and is a continuation of U.S. application Ser. No. 11/772,672, filed on Jul. 2, 2007, which issued as U.S. Pat. No. 8,081,164. Each of said applications is fully incorporated by reference herein.

FIELD

The present disclosure, in a broad sense, is directed toward handheld electronic devices. More specifically, the disclosure is directed toward handheld communication devices that have wireless communication capabilities and the networks within which the wireless communication devices operate. The present disclosure further relates to determination of the attitude of the handheld device and disablement of at least one user input device.

BACKGROUND

With the proliferation of wireless communications systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize all of the keyboard surface as efficiently as possible.

Many keyboards on mobile devices have an input device for navigation through the graphical user interface. These interfaces include such devices as trackballs and rotating wheels which can be used to affect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigational device are proximately located to one another.

Another keyboard spacing problem is that of finger overlap when keys are smaller than the user's finger and are spaced closely together. Because keys near the center of the keyboard are surrounded by other keys, they are particularly more difficult to press without the user's finger overlapping and inadvertently pressing an adjacent key.

Mobile communication devices can create potential problems for users of such devices when the keyboard or other input device on the handheld communication device is accidentally actuated. Various attempts to limit or minimize the risk of such activation include keyboard lock devices that lock the keyboard after a predetermined period of time has elapsed or upon a specific key combination entered by a user of the handheld electronic device. However, these keyboard locking combinations present challenges to the user of the device. For example, the user may not desire to always enter the lock period during this predetermined time, thus encouraging the user to disable the predetermined time lock on the handheld electronic device. Likewise, if the keyboard lock must be entered by the user selecting a particular set of keys, the user may forget to set this lock and continue to make accidental inputs to the device. Thus, it is desirable to enable a keyboard lock feature upon a predetermined gesture with the device by the user.

BRIEF DESCRIPTION OF THE DRAWINGS

Exemplary methods and arrangements conducted and configured according to the advantageous solutions presented herein are depicted in the accompanying drawings wherein:

FIG. 6e illustrates the handheld device in a fourth rotated position;

FIG. 6f illustrates the handheld device in a fifth rotated position;

FIG. 6g illustrates the handheld device in a sixth rotated position;

FIG. 7a illustrates an exemplary QWERTY keyboard layout;

FIG. 7b illustrates an exemplary QWERTZ keyboard layout;

FIG. 7c illustrates an exemplary AZERTY keyboard layout;

FIG. 7d illustrates an exemplary Dvorak keyboard layout;

FIG. 8 illustrates a QWERTY keyboard layout paired with a traditional ten-key keyboard;

FIG. 9 illustrates ten digits comprising the numerals 0-9 arranged in a traditional, ITU Standard E.161 numeric telephone keypad layout, including the * and # keys flanking the 0 key;

FIG. 10 illustrates a traditional or standard phone key arrangement or layout according to the ITU Standard E.161 including both numerals and letters;

DETAILED DESCRIPTION

Figure 1:
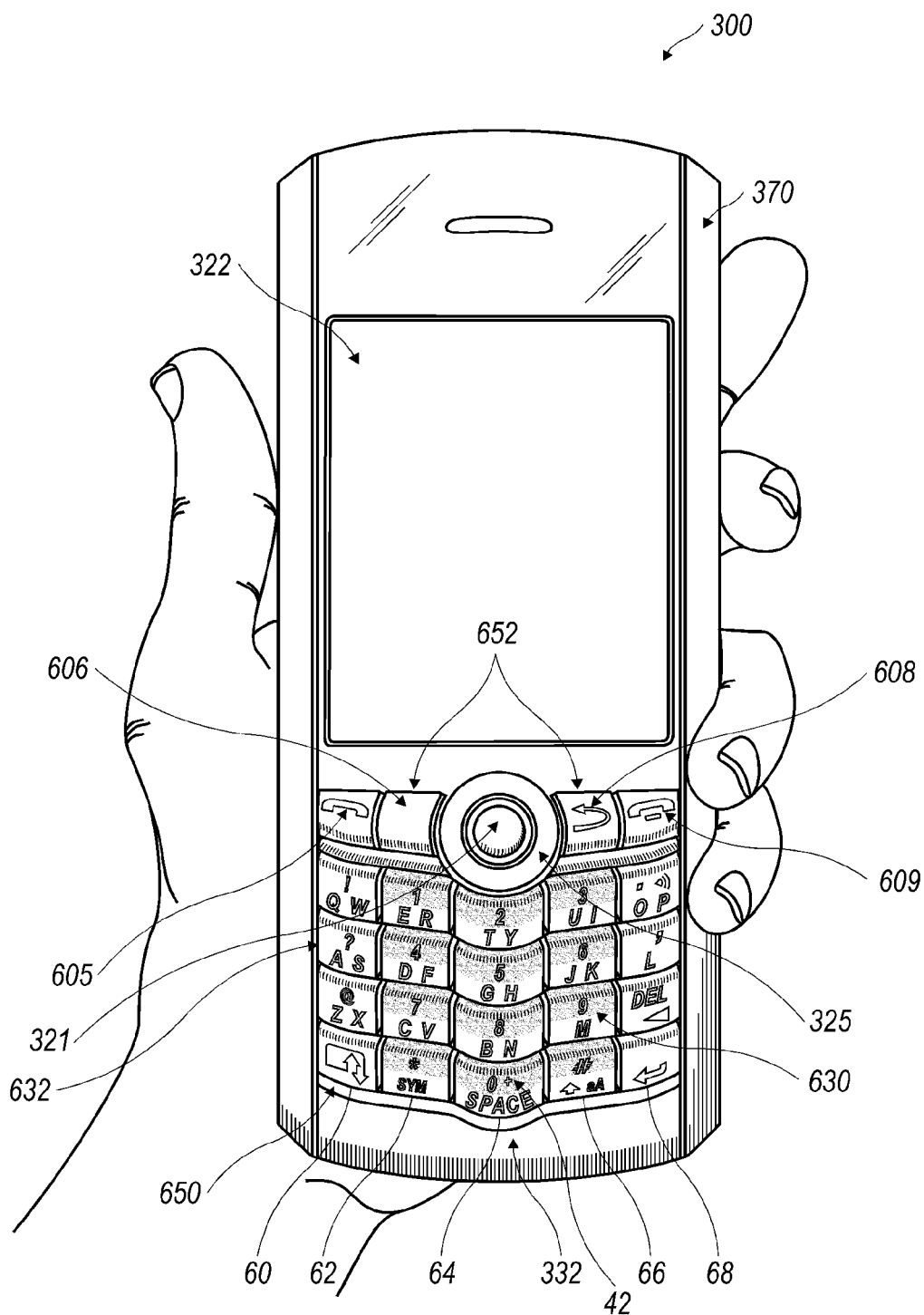
FIG. 1 illustrates a handheld communication device configured according to the present teachings cradled in the palm of a user's hand.
Figure 2:
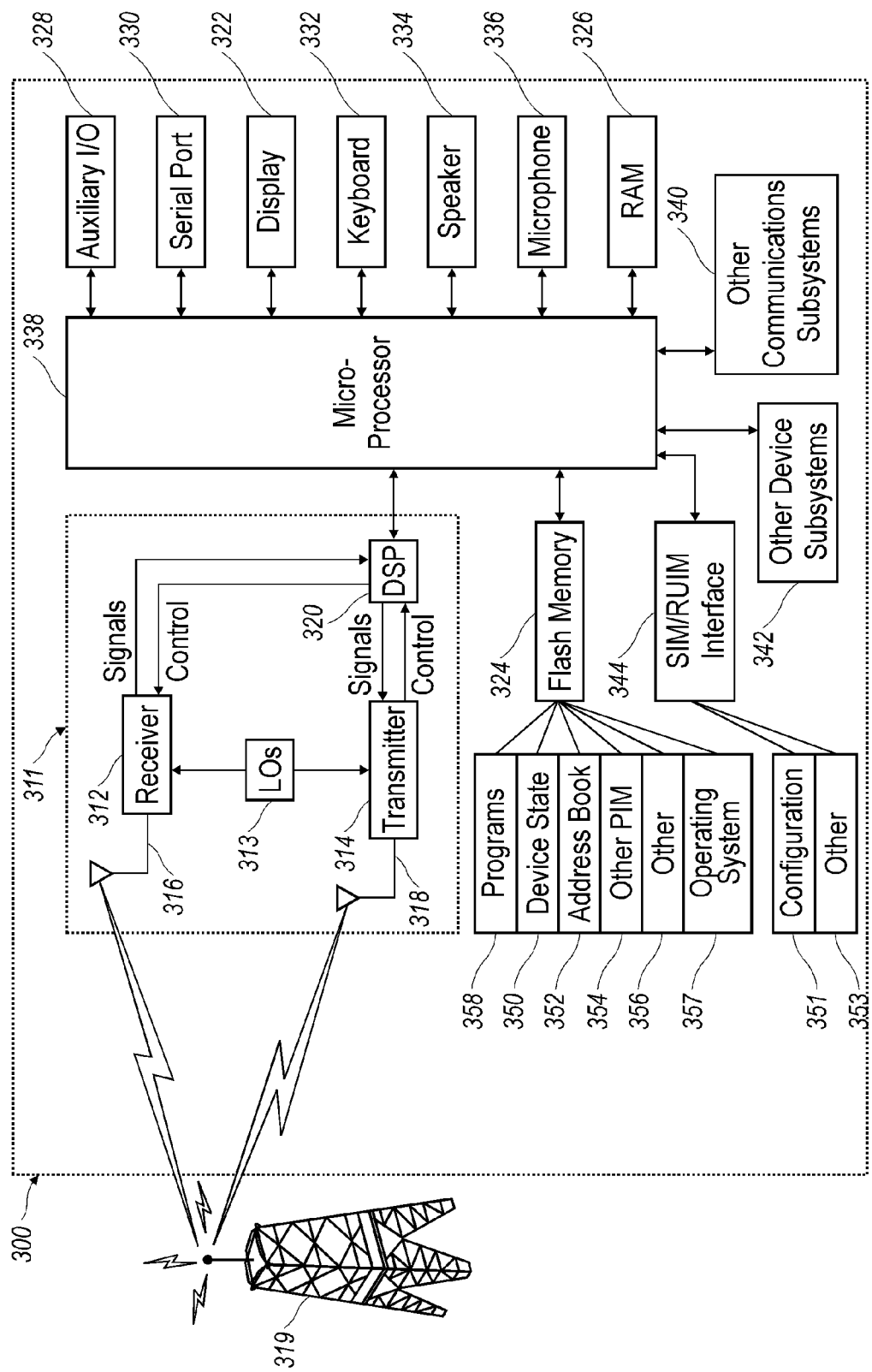
FIG. 2 is a block diagram representing a wireless handheld communication device interacting in a communication network.

An exemplary handheld electronic device 300 is shown in FIG. 1, and the device's cooperation in a wireless network 319 is exemplified in the block diagram of FIG. 2. These figures are exemplary only, and those persons skilled in the art will appreciate the additional elements and modifications necessary to make the device 300 work in particular network environments.

The block diagram of FIG. 2 denotes the device's 300 inclusion of a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system 357 functions and preferably enables execution of software applications on the communication device 300.

The included auxiliary I/O subsystem 328 can take the form of a variety of different navigation tools (multidirectional or single-directional) such as a trackball navigation tool 325 as illustrated in the exemplary embodiment shown in FIG. 1, or a thumbwheel, a navigation pad, or a joystick, or the like. These navigation tools are preferably located on the front surface of the device 300 but may be located on any exterior surface of the device 300. Other auxiliary I/O subsystems 328 can include external display devices and externally connected keyboards (not shown). While the above examples have been provided in relation to the auxiliary I/O subsystem 328, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, and may likewise be programmed accordingly.

As may be appreciated from FIG. 1, the handheld communication device 300 comprises a lighted display 322 located above a keyboard 332 constituting a user input and suitable for accommodating textual input to the handheld communication device 300. The front face of the device has a keyfield 650 that includes menu keys 652, alphanumeric keys 630, alphabetic keys 632, numeric keys 42, and other function keys as shown in FIG. 1. As shown, the handheld device 300 is of unibody construction, also known as a "candy-bar" design.

Keys, typically of a push-button or push-pad nature, perform well as data entry devices but present problems to the user when they must also be used to affect navigational control over a screen-cursor. In order to solve this problem the present handheld electronic device 300 preferably includes an auxiliary input 328 that acts as a cursor navigational tool and which is also exteriorly located upon the front face of the device 300. Its front face location is particularly advantageous because it makes the tool easily thumb-actuable like the keys of the keyboard. In a particularly useful embodiment, the navigational tool is a trackball navigational tool 325 which is easily utilized to instruct two-dimensional screen cursor movement in substantially any direction, as well as act as an actuator when the ball 321 is depressed like a button. The placement of the trackball 321 is preferably above the keyboard 332 and below the display screen 322; here, it avoids interference during keyboarding and does not block the user's view of the display screen 322 during use. (See FIG. 1).

As illustrated in at least FIG. 1, the present disclosure is directed to a handheld wireless communication device 300 configured to send and receive text messages. The device includes a hand cradleable body configured to be held in one hand by an operator of the device during text entry. A display 322 is included that is located on a front face 370 of the body and upon which information is displayed to the operator during text entry. A key field 650 is also located on the front face 370 of the elongate body and which comprises a plurality of keys including a plurality of alphanumeric keys, symbol keys, and function keys. A trackball navigation tool 325 is also located on the front face 370 of the body. The alphanumeric input keys comprise a plurality of alphabetic keys 632 having letters associated therewith. The order of the letters of the alphabetic keys 632 on the presently disclosed device can be described as being of a traditional, but non-ITU Standard E.161 layout.

The handheld wireless communication device 300 is also configured to send and receive voice communications such as mobile telephone calls. At least one key of the key field 650 is positioned adjacent to the trackball navigation tool and that key has a circular arc-shaped edge conformance fitting to a circular arc-shaped boundary about the trackball navigation tool 325. To facilitate telephone calls, two call keys 605, 609 oppositely and laterally flank the trackball navigation tool. One of the two call keys is a call initiation key 605 and the other is a call termination key 609.

The key 606 positioned adjacent to the trackball navigation tool 325 is a menu key that upon actuation displays an available action menu on the display in dependence of the currently running application on the device 300.

Furthermore, the device is equipped with components to enable operation of various programs, as shown in FIG. 2. In an exemplary embodiment, the flash memory 324 is enabled to provide a storage location for the operating system 357, device programs 358, and data. The operating system 357 is generally configured to manage other application programs 358 that are also stored in memory 324 and executable on the processor 338. The operating system 357 honors requests for services made by application programs 358 through predefined application program 358 interfaces. More specifically, the operating system 357 typically determines the order in which multiple applications 358 executed on the processor 338 and the execution time allotted for each application 358, manages the sharing of memory 324 among multiple applications 358, handles input and output to and from other device subsystems 342, and so on. In addition, users can typically interact directly with the operating system 357 through a user interface usually including the keyboard 332 and display screen 322. While in an exemplary embodiment the operating system 357 is stored in flash memory 324, the operating system 357 in other embodiments is stored in read-only memory (ROM) or similar storage element (not shown). As those skilled in the art will appreciate, the operating system 357, device application 358 or parts thereof may be loaded in RAM 326 or other volatile memory.

In one exemplary embodiment, the flash memory 324 contains programs/applications 358 for execution on the device 300 including an address book 352, a personal information manager (PIM) 354, and the device state 350. Furthermore, programs 358 and other information 356 including data can be segregated upon storage in the flash memory 324 of the device 300.

When the device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UTMS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in the presently described exemplary embodiment is equipped with an integral or internal antenna 318 for transmitting signals to the communication network 319. Likewise the communication device 300 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in the presently described exemplary embodiment is a digital signal processor (DSP) 320.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the device 300 is significantly enhanced (if not enabled) when connectable within a communication system, and particularly when connectable on a wireless basis in a network 319 in which voice, text messaging, and other data transfer are accommodated.

Figure 11:
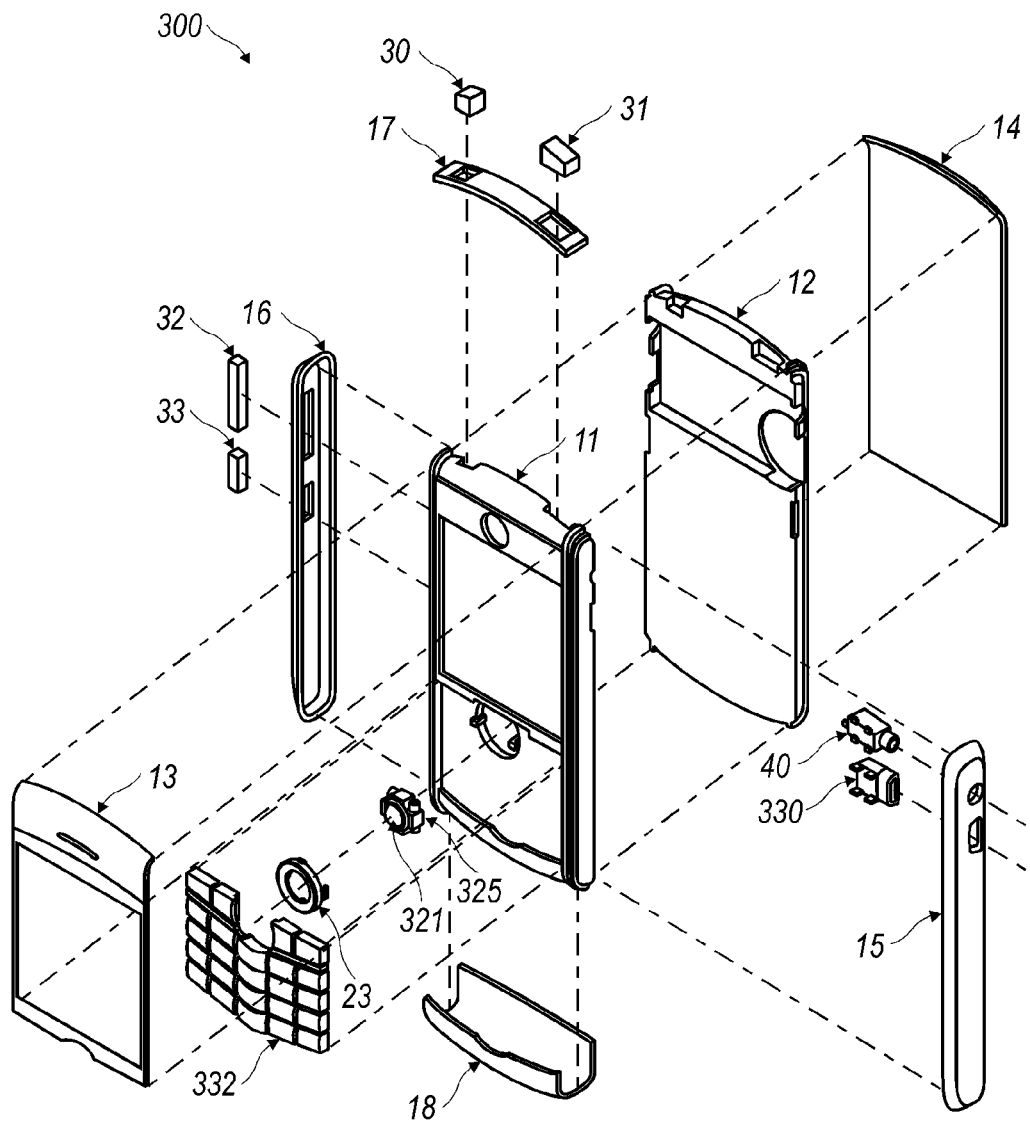
FIG. 11 is an exploded perspective view of an exemplary wireless handheld electronic device, incorporating a trackball assembly as the auxiliary user input.

Integration of the trackball assembly into handheld device 300 can be seen in the exploded view of FIG. 11 showing some of the typical components found in the assembly of the handheld electronic device 300. The construction of the device benefits from various manufacturing simplifications. The internal components are predominantly constructed on a single PCB (printed circuit board, not illustrated) 12. The keyboard 332 can be constructed from a single piece of material, and in some embodiments is made from plastic. The keyboard 332 sits over dome switches (not shown) located on the PCB 12 in a preferred embodiment. While in the presently described exemplary embodiment one switch is provided for every key on the keyboard 332, in other embodiments more than one switch or less than one switch per key are provided. The support frame 11 holds the keyboard 332 and trackball navigation tool 325 in place above the PCB 12. A lens 13 covers the display screen (not shown) to prevent damage. When assembled, the support frame 11 and the PCB 12 are fixably attached to each other and the display is positioned between the PCB 12 and support frame 11.

The trackball navigation tool 325 can be frictionally engaged with the support frame 11, but in one exemplary embodiment the trackball navigation tool 325 is removable when the device is assembled. This allows for replacement of the trackball navigation tool 325 if/when it becomes damaged or the user desires replacement with a different type of navigation tool. Other multidirectional navigation tools such as joysticks, four-way cursors, or touch pads are also considered to be within the scope of this disclosure. The trackball navigational tool 325 is fixed against the support frame 11 by a locking ring 23 that is removably engaged with the support frame. This configuration allows the trackball navigational tool 325 to be removed such as needed in servicing or replacement.

A serial port (preferably a Universal Serial Bus port) 330 and an earphone jack 40 are fixably attached to the PCB 12 and further held in place by right side element 15. Buttons 30-33 are attached to switches (not shown), which are connected to the PCB 12.

Final assembly involves placing the top piece 17 and bottom piece 18 in contact with support frame 11. Furthermore, the assembly interconnects right side element 15 and left side element 16 with the support frame 11, PCB 12, and lens 13. These side elements 15, 16 provide additional protection and strength to the support structure of the device 300. In a preferred embodiment, backplate 14 is removably attached to the other elements of the device.

Figure 3:
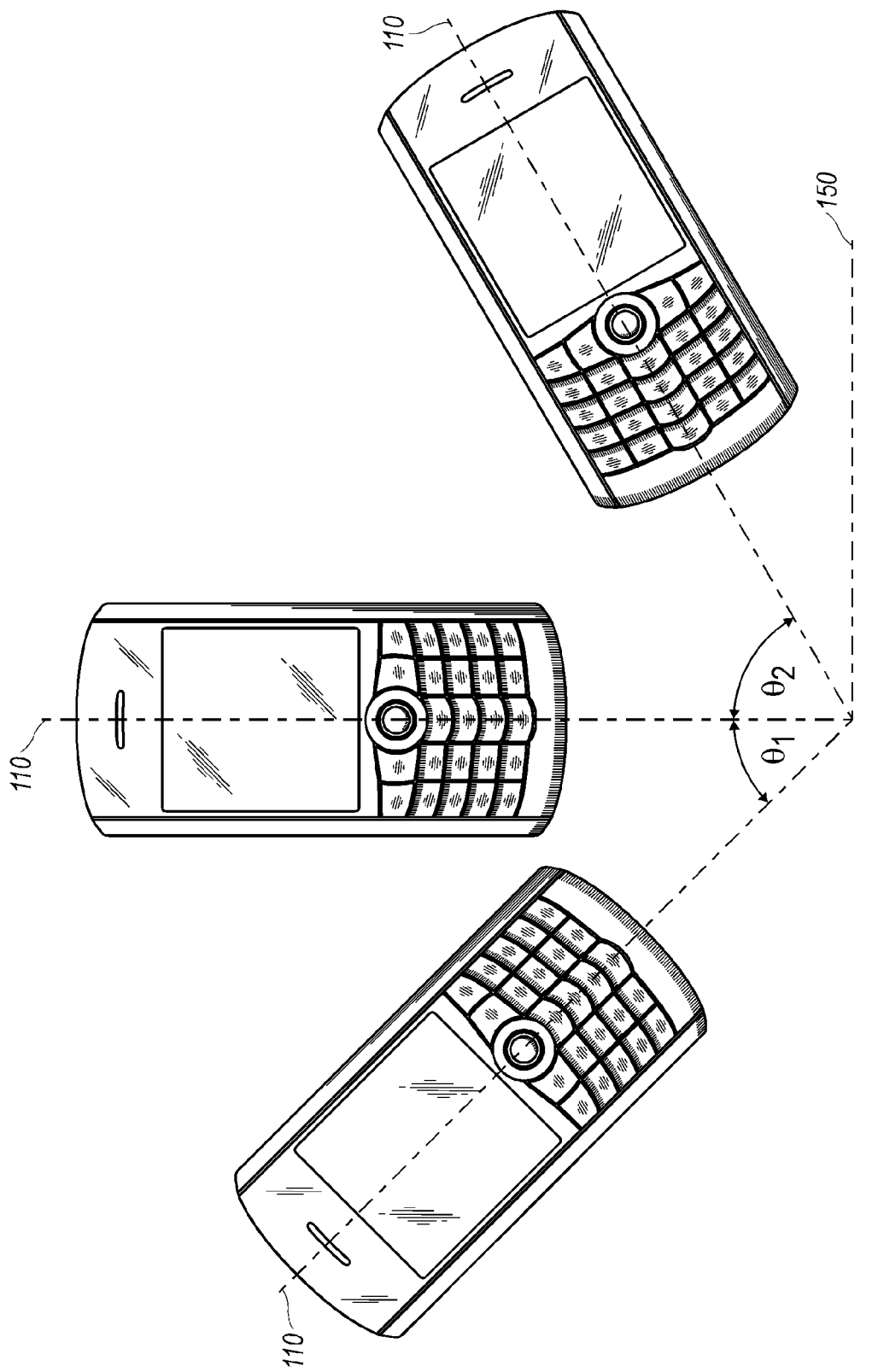
FIG. 3 illustrates the handheld device rotating about a first axis.

The wireless handheld electronic device 300 as described herein can be enabled such that certain handheld device 300 functionality is disabled when the attitude of the handheld device 300 exceeds predetermined values. The attitude of the handheld device 300 refers to the positioning of the handheld device 300 with respect to a defined orientation. For purposes of this description, the defined reference orientation will be the handheld device 300 in a vertical orientation. In this orientation as shown in FIG. 3, the handheld device 300 is located along a vertical axis 110. A sensor which is capable of detecting changes in the attitude is implemented inside the handheld device 300 to determine when the attitude of the handheld device 300 reaches predefined limits. As the handheld device 300 is rotated to the left at an angle such as $\theta_1$, the attitude sensor detects this rotation. When the angle and/or attitude exceeds the predetermined criteria a communication is sent to the microprocessor 338 indicative of the predetermined criteria. Alternatively, the sensor can be designed such that the information regarding the attitude is transmitted to microprocessor 338 which in turn determines when the attitude reaches the predetermined criteria.

Likewise, when the handheld device 300 is rotated to the right at an angle such as $\theta_2$, the sensor detects when the attitude of the handheld device 300 matches a predetermined attitude. Additionally, the microprocessor 338 can be programmed or otherwise designed such that it only disables the user input device once the predetermined attitude is matched for a predetermined period of time. While in some embodiments the predetermined attitude criteria and predetermined period of time are preprogrammed into the handheld device 300, other embodiments contemplate the ability of the user to adjust the criteria and time periods. The user may be permitted to enter this information through a program on the handheld device 300. In yet other embodiments, the handheld device 300 can be equipped with remote control software such that an administrator can control the handheld device 300 and adjust these settings among others.

User input devices as described herein refer to a broad range of devices that are designed to facilitate user interaction with the handheld device 300. These user input devices allow the user to input data to the handheld device 300 in order to allow the handheld device 300 to perform a variety of different functions. For example, a user input device could be a navigation control tool such as a trackball navigational tool 325 that allows the user to control cursor navigation on a paged displayed to the user on the screen 322 of the handheld device 300. In another example, the user input is a keyboard 332 which can incorporate keys labeled according to one of the key arrangements described herein. In other embodiments, the user input device can include a touch sensitive screen adapted to allow user interaction with displayed items. The above examples of various user input devices are not considered to be limited but merely illustrative of the types of devices that could be classified as user input devices.

Figure 4:
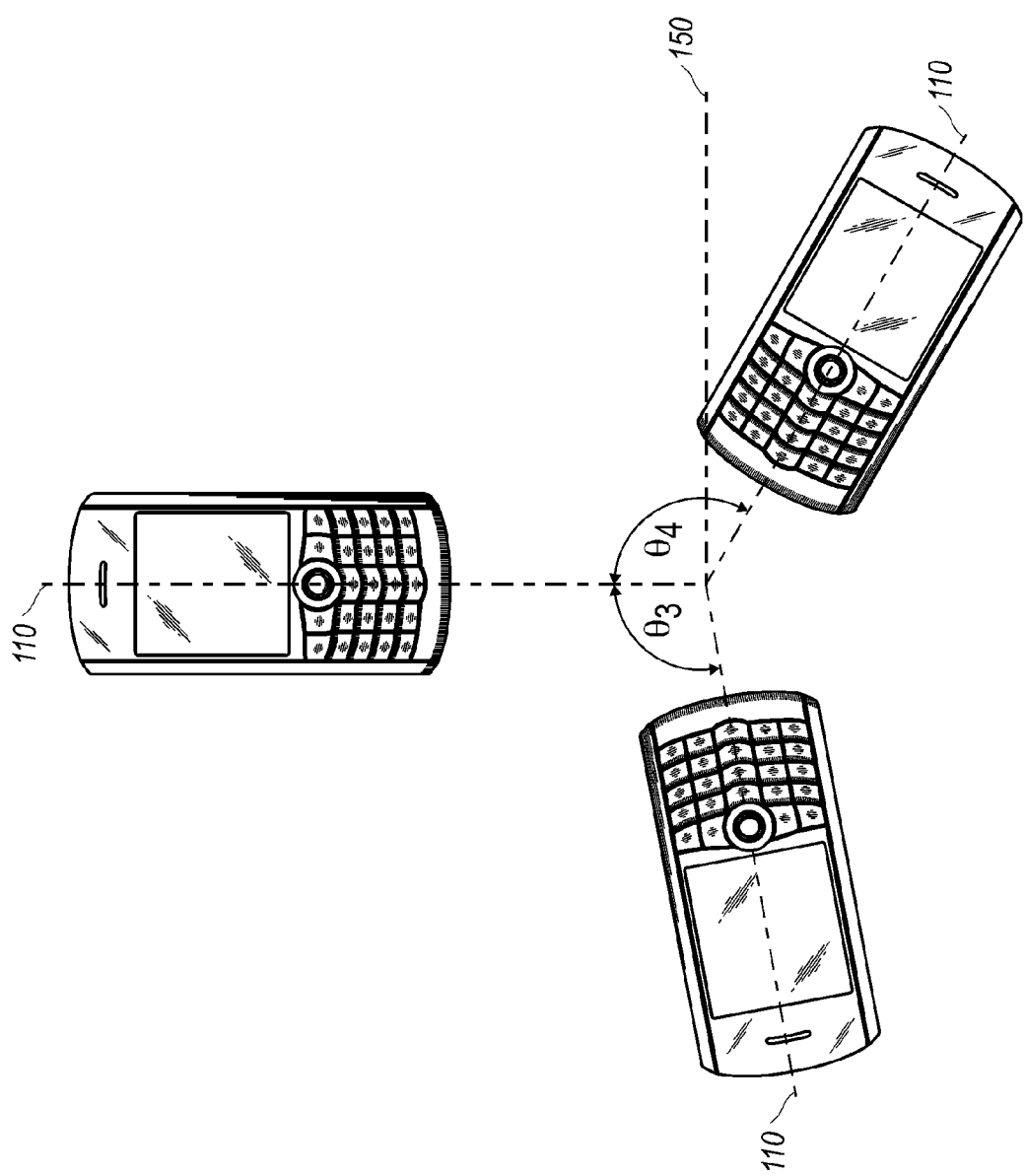
FIG. 4 illustrates the handheld device further rotating about a first axis.

The predetermined attitude criteria can be set in relation to one or more axes of rotation. FIGS. 3 and 4 illustrate the handheld device 300 rotating about a first axis and FIGS. 6*a-g* illustrate rotation of the handheld device 300 about a second axis of rotation. In the embodiments as illustrated, the handheld device 300 is rotated to right or left from an initial condition position or reference orientation. In at least one embodiment, the predetermined attitude criterion occurs when the handheld device 300 is rotated more than ninety degrees from the reference orientation. Furthermore, the predetermined criteria can require that the handheld device 300 be rotated to some fixed angle beyond ninety degrees such as angles $\theta_3$ and $\theta_4$ as shown in FIG. 4. For example angle $\theta_3$ could be approximately 110 degrees and angle $\theta_4$ could be approximately 135 degrees. These angles are given as examples only and other angles are considered within the scope this disclosure.

Figure 5:
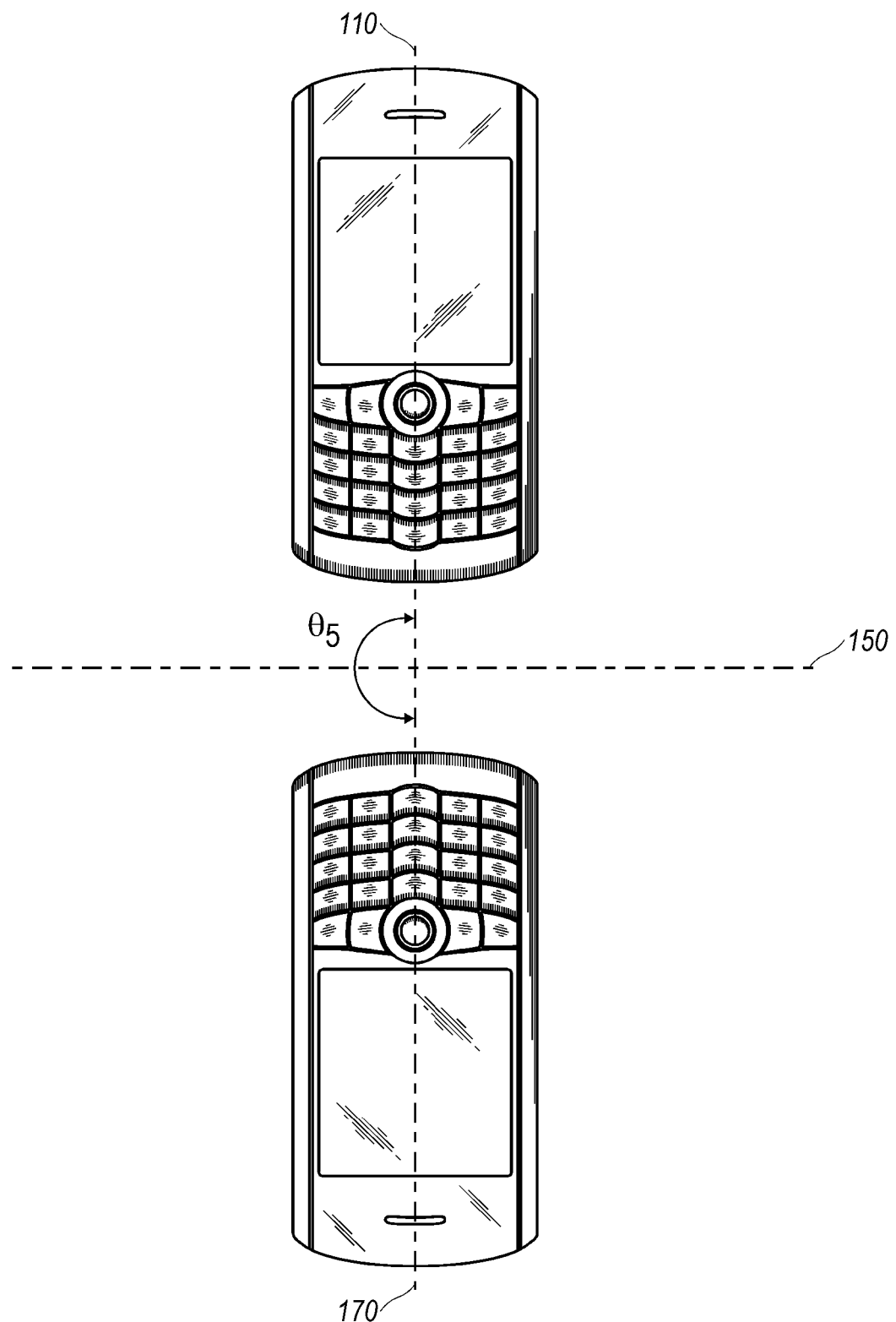
FIG. 5 illustrates the handheld device rotating to a substantially upside down position.
Figure 6A:
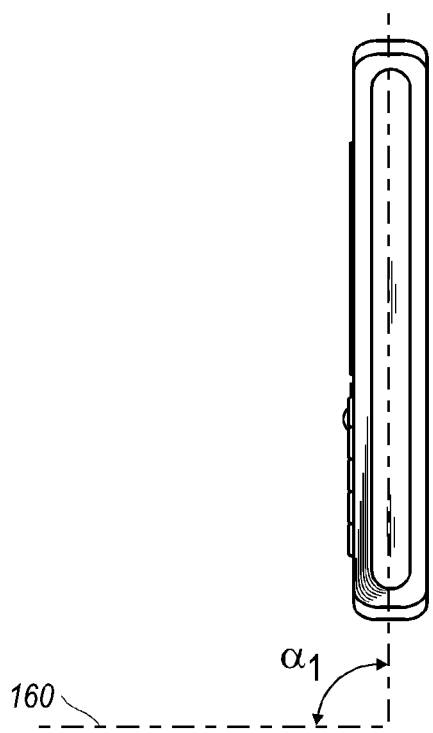
FIG. 6a illustrates the handheld device in a substantially upright position.

In yet another exemplary embodiment, the predetermined criteria is an upside down attitude as shown in FIG. 5. While the handheld device 300 is shown in a completely upside down attitude, other embodiments are substantially upside down or within a few degrees of this upside down attitude. As shown, the angle $\theta_5$ is approximately 180 degrees from the default orientation. In other exemplary embodiments, the range at which the upside down position occurs is between 165 degrees and 180 degrees from the default orientation Furthermore, the attitude of the handheld device 300 can be described with respect to rotation of the handheld device 300 about a second axis as shown in FIGS. 6*a-g*. When the handheld device 300 is being operated by a user, it is generally held in a position that is tilted downward from an upright position. The substantially upright position of the handheld device 300 is shown in FIG. 6*a*, where the centerline 120 of the handheld device 300 is at angle $\alpha_1$ measured from the horizontal axis on the front face side of the handheld device 300 to the centerline 120 of the handheld device 300. The deviation of attitude of the handheld device 300 with respect to this substantially upright position can be measured and sent to the processor for further processing. Alternatively, the signal may be sent only once the sensor has detected that the attitude of the handheld device 300 matches the predetermined criteria. As shown the angle $\alpha_1$ is approximately ninety degrees when the handheld device 300 is in the upright position.

Figure 6B:
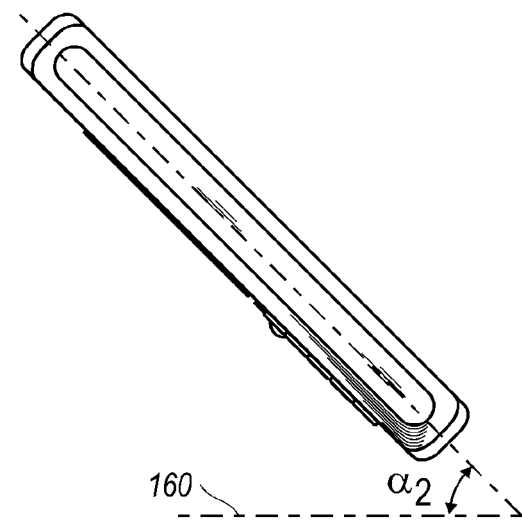
FIG. 6b illustrates the handheld device in a first rotated position.

In order to exemplify some of the types of deviations that may or may not meet the predetermined criteria, FIGS. 6*b-g* are presented and described herein. FIG. 6*b* depicts the handheld device 300 tilting forward from the upright position such that the angle $\alpha_2$ is less than the angle $\alpha_1$. In at least one embodiment, the predetermined criteria is met when the angle between the centerline of the handheld device 300 and the horizontal reference line 160 on the front face side of the handheld device 300 is less than 65 degrees. Other similar angles can be used as the predetermined criteria depending on size of the handheld device 300 and the ability of the user to use such a handheld device 300 at the particular incline. For instance, the angle at which the predetermined criteria is matched could be 45 degrees.

Figure 6C:
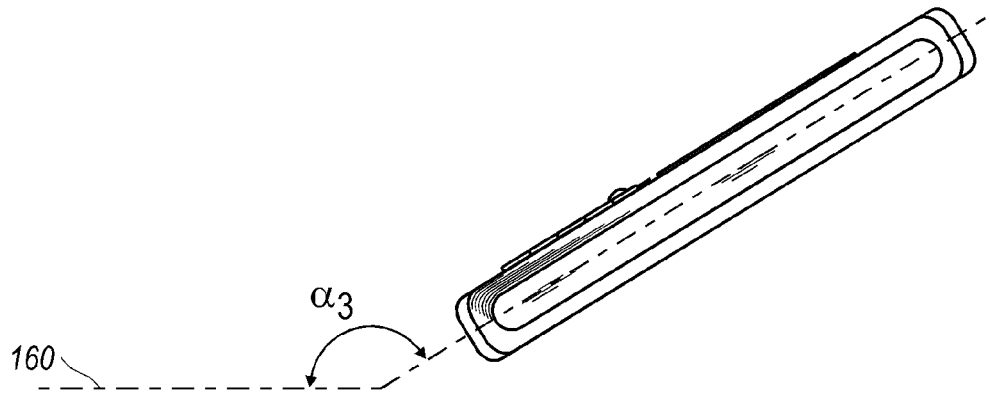
FIG. 6c illustrates the handheld device in a second rotated position.
Figure 6D:
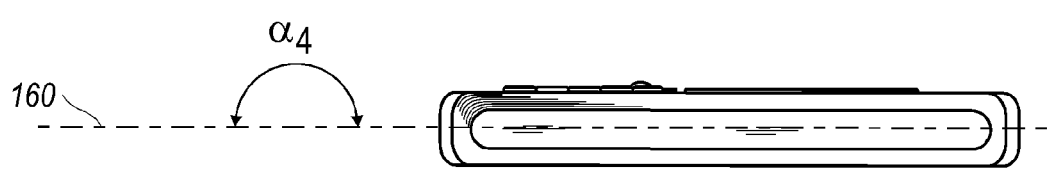
FIG. 6d illustrates the handheld device in a third rotated position.

When the handheld device 300 is rotated at angles that are in the opposite direction from the angle of rotation as shown in FIG. 6*c*, the handheld device 300 is often used at varying angles of inclination. A user may prefer to hold the handheld device 300 at an angle $\alpha_3$ such that the device is at an approximately 135 degree angle from reference line 160. Individual users may hold the handheld device 300 at angles ranging from approximately 120 degree to 165 degrees during typical usage. However, most users will not input text into the handheld device 300 once the angle of inclination reaches beyond a certain comfortable posture. For example, the usability of the handheld device 300 declines as the angle of the device 300 extends beyond the 180 degree orientation as shown by angle $\alpha_4$ in FIG. 6d. While the handheld device 300 shown in FIG. 6e, at an angle $\alpha_4$ of approximately 255 degrees, can be used by some users, it begins to become uncomfortable as the angle continues to increase until it reaches a substantially upside down position as shown in FIG. 6f, where angle $\alpha_6$ is approximately 270 degrees. Some users may prefer to use the handheld device 300 in almost a substantially upside down position in certain circumstances. However, since the screen 322 becomes obscured, the user of the handheld device 300 cannot hold the handheld device 300 at this position for more than a predetermined period of time if they wish to see the display screen 322.

Once the angle of the handheld device 300 rotation extends beyond the upside down position as shown in FIG. 6f, the use of the handheld device 300 becomes difficult. One such angle is the angle $\alpha_7$, as shown in FIG. 6g. The above positions of the handheld device 300 can be used by the processor to enable or disable functionality of the handheld device 300 as will be explained below.

When the attitude of the handheld device 300 matches the predetermined attitude at least one user input device is disabled. The disablement can be performed by the microprocessor 338 of the handheld device 300. The user input device that is disabled is a device that allows the user to interact with the handheld device 300 by inputting commands and data. In one example, the user input device is a keyboard 332 which can be arranged according the other descriptions provided herein relating to keyboards and/or key arrangements. The keys of the keyboard 332 are susceptible to accidental or other unintentional actuation and thus it is desirable to disable the keys under certain circumstances. One of these circumstances is the attitude of the handheld device 300. The attitude of the handheld device 300 can be understood in relation to a reference orientation or other type of frame of reference which has been described in detail above. When the handheld device 300 is rotated in a particular direction or beyond a certain point, the use of the keyboard 332 is unlikely. For example when the keyboard 332 is arranged such that indicia on the keys are upside down and the display screen 322 is located beneath the keyboard 332, it is unlikely the user of the handheld device 300 will require input using the keys of the keyboard 332.

Likewise, other user input devices can be disabled when the attitude of the handheld device 300 matches a predetermined criteria. Auxiliary user input devices, such as one of the above described navigation tools, can also be disabled either in conjunction with or separate from the keyboard 332. In at least one example, the navigation tool is a trackball navigation tool 325 and is located essentially between the display screen 322 of the handheld device 300 and the keyboard 332 as shown in FIG. 1. Other side input keys can be disabled as well. These side input keys can be programmable keys or special function keys for enablement of certain handheld device 300 functions like a camera.

In order to detect the attitude of the handheld device 300, an attitude sensor is provided within the body of the wireless handheld electronic device 300. The attitude sensors can be any of the known sensors in the art and a few examples of attitude sensors are provided herein. For example, the attitude sensor could be a tilt sensor which is capable of determining the tilt of the handheld device 300 with respect to a reference position or orientation. The tilt sensor can be programmed or designed to output either a signal once a predetermined criteria has been matched or to continuously output the angle of tilt from the reference orientation. In another embodiment, the tilt sensor is an inclinometer which determines the incline of the object with respect to a reference position. The inclinometer generally uses a reference position that is oriented along a horizontal plane to measure the angle of incline. However, other inclinometers may use reference orientations that are in the vertical orientation such as the one shown in FIG. 3. The inclinometer can be constructed using one of the known methods in the skill of the art. Among these methods are gravity based sensors which implement moving masses, fluidic sensors, and gas sensors. In another example, the angle of the incorporating object can be detected using a Micro-Electro-Mechanical (MEM) system that can include one of the above types of sensors on a micro-scale.

Thus, the inclinometer could be implemented to detect the angles of inclination as shown in FIGS. 6a-g. In one example, other sensors, maybe implemented in order to detect the change in attitude of the handheld device 300. In a particular example, an accelerometer can be used to detect changes in attitude. These types of attitude detection sensors detect changes in acceleration to determine the attitude of the handheld device 300. These types of sensor typically involve masses of varying sizes and circuits to detect the acceleration of the mass. In a specific embodiment, the accelerometer is a gravimeter that detects the force of gravity acting on accelerometer. Again, a MEM system can be implemented to detect the attitude of the handheld device 300 using acceleration. These MEM devices are miniaturized and can be located within the body of the handheld electronic device 300 without increasing the size of the handheld device 300 significantly. Additionally, the accelerometer can be used to switch the operation of the display of the handheld device 300 between a portrait and landscape mode. Thus, it is possible to utilize a single device for detection of attitude and screen orientation.

In a handheld device 300 equipped with the attitude sensor and microprocessor 338 that is capable of disabling the user input devices, it is desirable to notify the user of such disablement. The handheld device 300 is often equipped with a speaker for communication purposes as well as notification purposes. Once the predetermined criteria has been detected and the user input device disabled, a notification signal can be sent from the microprocessor 338 to the speaker 334. This notification signal can be sent proximate to the disablement of the user input device; thus the signal could be sent before or after the disablement of the user input device occurs. Likewise, the user can be notified through a vibration device associated with the handheld electronic device 300. This vibration device can be one available in the art including a flywheel and mass based vibration device where the mass rotates randomly or uniformly. Furthermore, the user could be notified through the display screen of the handheld device 300. Alternatively, a short message could be displayed on the screen informing the user about disablement of a user input device. This message could tell the user how to stop the disablement of the user input device and/or resume normal operation after the user input device has been disabled.

In at least one embodiment, the wireless handheld electronic device 300 is equipped with an attitude sensing means that detects the attitude of the handheld device 300 as held by a user. The attitude sensing means is in data-communication with a control means, such as microprocessor 338 or a microprocessor-based control means. The attitude sensing means can be one of the above described sensors, combination thereof, or others as known to one skilled in the art. The control means can be a microprocessor 338 or other circuitry or hardware that is configured to control certain aspects of the handheld device 300. Additionally, the attitude sensing means communicates data to the control means indicative of the detected attitude of the handheld device 300. The control means receives and processes the communicated data from the attitude sensing means and the control means disables a user input means when the detected attitude of the handheld device 300 matches a predetermined attitude criteria. The user input means, through which a user inputs information, is also in data-communication with the control means. The user input means can be one of the above described user input devices or others as known in the state of the art.

Furthermore, the handheld device 300 is equipped with a display means that is also in data-communication with the control means. The display means presents information for user observation thereupon based upon data output from the control means to the display means. The display means can be a display screen or the like as herein described including a liquid crystal display and a touch sensitive screen. Additionally, the microprocessor-based control means is capable of receiving, processing and outputting other types of data as necessary to control the handheld device 300 including those components described above in connection with schematic diagram of FIG. 2.

In at least one embodiment, the control means of the wireless handheld electronic device 300 disables the user input means only after the detected attitude of the handheld device 300 matches the predetermined attitude criteria for a predetermined period of time. In one example, the predetermined attitude criteria is an upside down attitude as described above. Furthermore, the wireless handheld electronic device 300 can be equipped with a user informing means in data-communication with the control means. The user informing means outputs a signal to the user of the handheld device 300 when the user input means is disabled based upon the detected attitude. In at least one embodiment, the user informing means is a speaker 334 such that an audible sound is produced to notify the user of disablement of the user input device. While in another embodiment, the user input means is a vibration device such that handheld device 300 vibrates. In yet another embodiment, the user input means is a light that notifies the user by flashing or changing color. The attitude sensing means can be one of the above described sensors including a tilt sensor, an inclinometer, an accelerometer, and a gravimeter. Additionally, the user input means could be a keyboard 332 such as those described herein. Alternatively, the user input means could be an auxiliary user input device 328 such as a trackball navigation tool which can be configured as described herein. In at least one embodiment, the user input means includes both a keyboard 332 as well as an auxiliary user input device 328 which can be a trackball that is located between the display screen 322 and keyboard 332.

Figure 12:
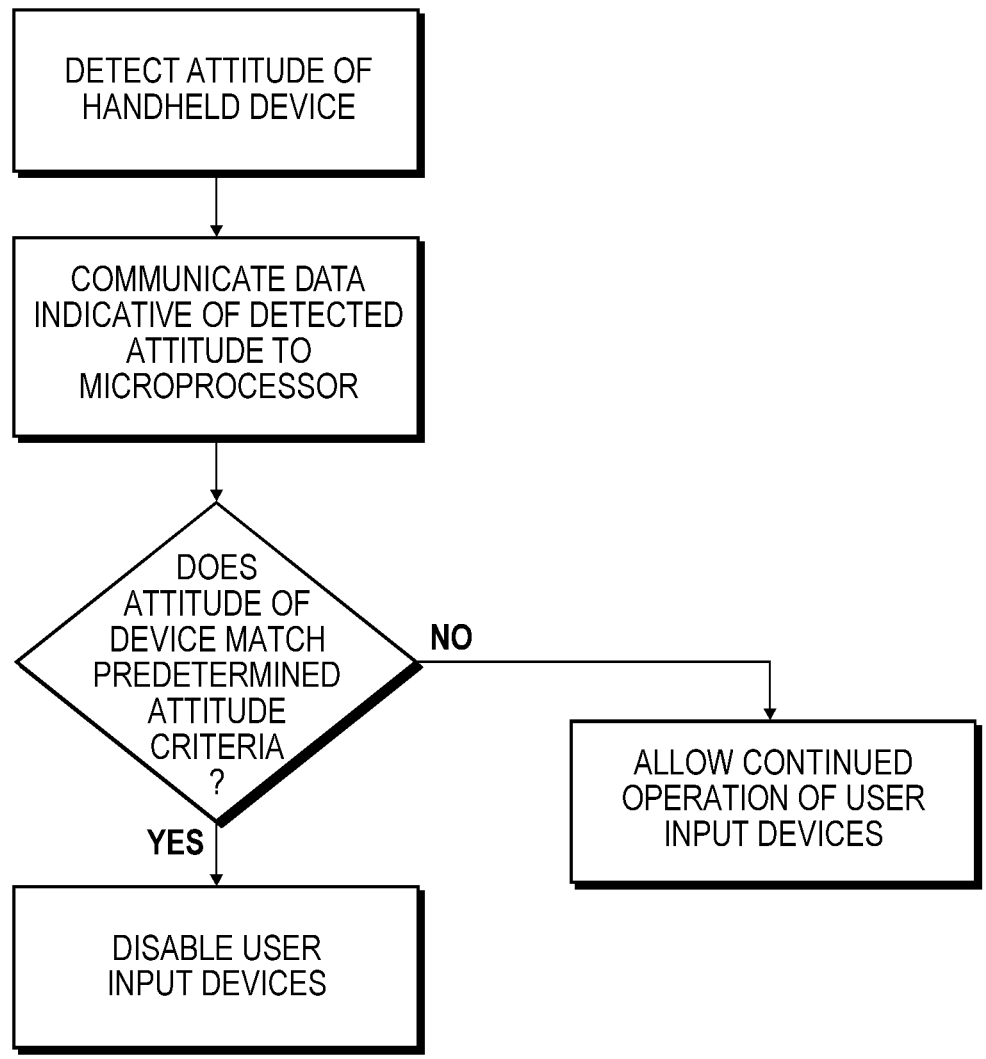
FIG. 12 is a flow chart of an exemplary method of disabling a user input device in response to a detected attitude.

In at least one embodiment, a method for detection and disablement of a user input device on a handheld electronic device 300 is presented in FIG. 12. First, the method involves detecting the attitude of the handheld device 300 (block 420). This detection of the attitude of the handheld device 300 can be through one of the above described devices and/or means. The method then communicates the data indicative of the detected attitude to the microprocessor 338 of the handheld device 300 (block 430). Then, a determination is made whether the detected attitude of the handheld device 300 matches a predetermined attitude (block 440). If the attitude of the handheld device 300 matches the predetermined attitude, then at least one user input device is disabled (block 450). Otherwise, the operation of the user input devices can continue to operate according to normal procedures (block 460).

As intimated hereinabove, one of the more important aspects of the handheld electronic device 300 to which this disclosure is directed is its size. While some users will grasp the device 300 in both hands, it is intended that a predominance of users will cradle the device 300 in one hand in such a manner that input and control over the device 300 can be effected using the thumb of the same hand in which the device 300 is held. However, it is appreciated that additional control can be effected by using both hands. As a handheld device 300 that is easy to grasp and desirably pocketable, the size of the device 300 must be kept commensurately small. Of the device's dimensions, limiting its width is important for the purpose of assuring cradleability in a user's hand. Moreover, it is preferred that the width of the device 300 be maintained at less than eight centimeters (approximately three inches). Keeping the device 300 within these dimensional limits provides a hand cradleable unit that users prefer for its usability and portability. Limitations with respect to the height (length) of the device 300 are less stringent when considering hand-cradleability. Therefore, in order to gain greater size, the device 300 can be advantageously configured so that its height is greater than its width, but still remain easily supported and operated in one hand.

A potential problem is presented by the small size of the device 300 in that there is limited exterior surface area for the inclusion of user input and device output features. This is especially true for the "prime real estate" on the front face 370 of the device 300, where it is most advantageous to include a display screen 322 that outputs information to the user. The display screen 322 is preferably located above a keyboard 332 that is utilized for data entry into the device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 322 during data entry periods.

To facilitate textual data entry into the device 300, an alphabetic keyboard is provided. In one version, a full alphabetic keyboard is utilized in which there is one letter per alphabetic key. In this regard, the associated letters can be advantageously organized in QWERTY, QWERTZ, AZERTY, or Dvorak layouts, among others, thereby capitalizing on certain users' familiarity with these special letter orders. In order to stay within the bounds of the limited front surface area, however, each of the keys must be commensurately small when, for example, twenty-six keys must be provided in the instance of the English language.

An alternative configuration is to provide a reduced keyboard in which at least some of the keys have more than one letter associated therewith (see FIG. 1 for an example). This means that fewer keys are required which makes it possible for those fewer keys to each be larger than in the instance when a full keyboard is provided on a similarly dimensioned device. Some users will prefer the solution of the larger keys over the smaller ones, but it is necessary that software or hardware solutions be provided in order to discriminate which of the several associated letters the user intends based on a particular key actuation, a problem the full keyboard avoids.

Preferably, the character discrimination is accomplished utilizing disambiguation software included on the device 300.

To accommodate software use on the device 300, a memory 324 and microprocessor 338 are provided within the body of the handheld unit for receiving, storing, processing, and outputting data during use. Therefore, the problem of needing a textual data input means is solved by the provision of either a full or reduced alphabetic keyboard on the presently disclosed handheld electronic device 300. It should be further appreciated that the keyboard can be alternatively provided on a touch sensitive screen in either a reduced or full format.

As shown in FIG. 1, the handheld electronic device 300 is cradleable in the palm of a user's hand. The handheld device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably can be arranged in a row of keys including a navigation tool. Additionally, the row of keys, including the navigation tool, preferably has a menu key 606 and a back key or escape key 608. The menu key 606 is used to bring up a menu on the display screen 322 and the escape key 608 is used to return to the previous screen or previous menu selection.

The handheld electronic device 300 includes an input portion and an output display portion. The output display portion can be a display screen 322, such as an LCD or other similar display device.

The keyboard 332 includes a plurality of keys that can be of a physical nature such as actuable buttons or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia, representing character(s), command(s), and/or functions(s), displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of virtual keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld electronic device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figures 7A, 7B, 7C, 7D:
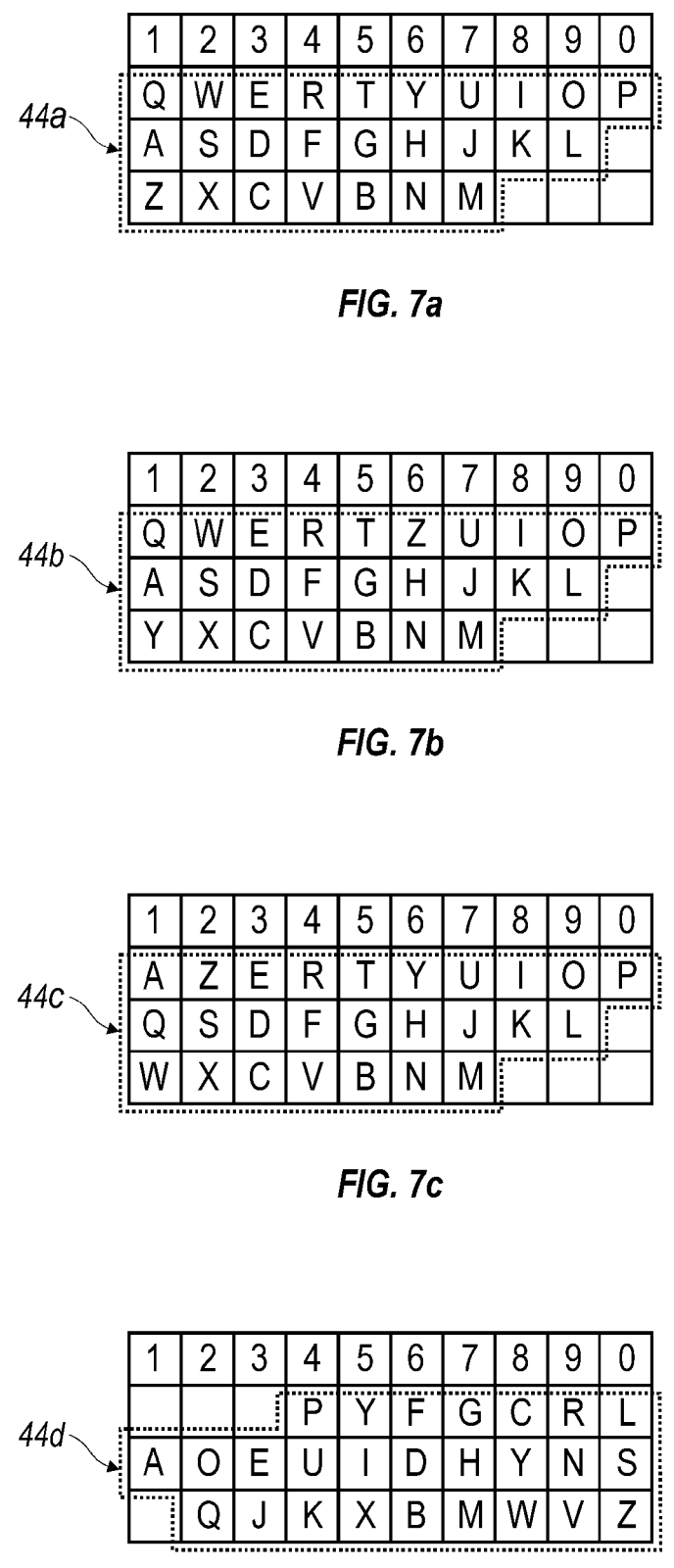

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 7a. The QWERTZ keyboard layout is normally used in German-speaking regions; this alphabetic key arrangement 44b is shown in FIG. 7b. The AZERTY keyboard layout 44c is normally used in French-speaking regions and is shown in FIG. 7c. The Dvorak keyboard layout was designed to allow typists to type faster; this alphabetic key arrangement 44d is shown in FIG. 7d. In other exemplary embodiments, keyboards having multi-language key arrangements can be contemplated.

Alphabetic key arrangements are often presented along with numeric key arrangements. Typically, the numbers 1-9 and 0 are positioned in the row above the alphabetic keys 44a-d, as shown in FIG. 7a-d. Alternatively, the numbers share keys with the alphabetic characters, such as the top row of the QWERTY keyboard. Yet another exemplary numeric key arrangement is shown in FIG. 8, where a "ten-key" style numeric keypad 46 is provided on a separate set of keys that is spaced from the alphabetic/numeric key arrangement 44. Still further, ten-key numeric arrangements may be common with or shared with a subset of the alphabetic keys. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 9.

As shown in FIG. 9, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality so that there is one letter per alphabetic key.

FIGS. 9 and 10 both feature numeric keys arranged according to the ITU Standard E. 161 form. In addition, FIG. 10 also incorporates alphabetic characters according to the ITU Standard E. 161 layout as well.

As intimated above, in order to further reduce the size of a handheld electronic device 300 without making the physical keys or virtual keys too small, some handheld electronic devices 300 use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor 338 of these types of handheld electronic devices 300 to determine or predict what letter or word has been intended by the user. Some examples of software include predictive text routines which typically include a disambiguation engine and/or predictive editor application. The software preferably also has the ability to recognize character letter sequences that are common to the particular language, such as, in the case of English, words ending in "ing." Such systems can also "learn" the typing style of the user making note of frequently used words to increase the predictive aspect of the software. Other types of predictive text computer programs may be utilized with the reduced keyboard arrangements described herein, without limitation. Some specific examples include the multitap method of character selection and "text on nine keys".

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

FIG. 1 shows a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 332. While in other embodiments, the number "0" may be located on other keys. Many of the keys have different sizes than the other keys, and the rows are non-linear. In particular, the keys in the middle column 64 are wider than keys in the outer columns 60, 62, 66 and 68. To readily identify the phone user interface (the second user interface), the numeric phone keys 0-9 include a color scheme that is different from that of the remaining keys associated with the QWERTY key arrangement. In the exemplary embodiment illustrated in FIG. 1, the keyboard includes a color scheme of the numeric phone keys has a two tone appearance, with the upper portion of the numeric keys being a first color and the lower portion of the numeric keys being a second color. The first color may be lighter than the second color, or darker than the second color.

Another embodiment of a reduced alphabetic keyboard is found on a standard phone keypad 42. Most handheld electronic devices 300 having a phone key pad 42 also typically include alphabetic key arrangements overlaying or coinciding with the numeric keys as shown in FIG. 10. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIGS. 9 (no alphabetic letters) and 10 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. As shown in FIG. 1, the numeric key arrangement can be overlaid on a QWERTY arrangement. The numeric arrangement as shown can be aptly described as a top-to-bottom ascending order three-by-three-over-zero pattern While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

Exemplary embodiments have been described hereinabove regarding both handheld electronic devices 300, as well as the communication networks 319 within which they cooperate. Again, it should be appreciated that the focus of the present disclosure is determination of the attitude of the handheld electronic device 300 along with disablement of user input devices.

What is claimed is:

1. An electronic device comprising:
a processor;
an input device communicatively coupled with the processor;
a sensor communicatively coupled with the processor, the sensor adapted to detect the attitude of the device, wherein the sensor is adapted to communicate data indicative of the attitude of the device to the processor;
the processor is configured to execute instructions to:
compare the attitude with a predetermined attitude criteria, and
disable further processing of data received from the input device in the event that the attitude is not less than the predetermined attitude criteria for at least a predetermined period of time; and
an informing device communicatively coupled with the processor, the informing device adapted to output a notification when further processing of data from the input device is disabled, the notification indicating the further processing of data from input device is being disabled.

2. The electronic device of claim 1, wherein the input device comprises a touchscreen.

3. The electronic device of claim 1, wherein the input device comprises at least one of telephone keypad, a navigational tool, an auxiliary user input device, a touchscreen, a keyboard, and a user input key.

4. The electronic device of claim 1, further comprising a non-disabled input device that continues to receive data in the event that the predetermined attitude is not less than the predetermined attitude criteria for a predetermined period of time.

5. The electronic device of claim 1, wherein the electronic device further comprises a top portion and a bottom portion and said predetermined attitude criteria being an upside down attitude such that the top portion is below the bottom portion.

6. The electronic device as recited in claim 1, wherein said sensor is one of a tilt sensor, an inclinometer, an accelerometer, and a gravimeter.

7. The electronic device as recited in claim 1, wherein the informing device is a vibrator and the notification is a vibration.

8. The electronic device as recited in claim 1, the informing device is a speaker and the notification is an audible sound.

9. The electronic device as recited in claim 1, the informing device is a display and the notification is a message on the display.

10. The electronic device as recited in claim 1, further comprising a display, wherein the processor is further configured to execute instructions to cause the display to present a message informing the user how to resume normal operation including receiving input from the input device.

11. The electronic device as recited in claim 1, wherein the notification is provided proximate to the disabling the further processing of data from the input device, such that the notification is provided at substantial the same time as the disabling the further processing of the data, shortly before the disabling the further processing of the data, or shortly after disabling the further processing of the data.

12. A method for disabling processing of input received from at least one input device on an electronic device comprising:
    generating data, at a sensor of the electronic device, indicative of an attitude of an electronic device;
    determining, at a processor of the electronic device, that the data indicative of the attitude is not less than a predetermined attitude criteria for a predetermined period of time;
    disabling further processing of data received from an input device in response to the data indicative of the attitude is not less than the predetermined attitude criteria for the predetermined period of time; and
    providing a notification when disabling the further processing of the data, said notification signal indicating the further processing of data received from the input device is being disabled.

13. The method as recited in claim 12, wherein the input device comprises a touchscreen.

14. The method as recited in claim 12, wherein the input device comprises at least one of telephone keypad, a navigational tool, an auxiliary user input device, a touchscreen, a keyboard, and a user input key.

15. The method as recited in claim 12, further comprising receiving data from a non-disabled input device in the event that the predetermined attitude is not less than the predetermined attitude criteria for at least a predetermined period of time.

16. The method as recited in claim 12, wherein the predetermined attitude criteria is an upside down attitude and wherein determining the data indicative of the attitude is not less than the predetermined attitude criteria comprises:
    determining a bottom portion of the electronic device is positioned above a top portion of the electronic device.

17. The method as recited in claim 12, wherein the providing the notification occurs proximate to the disabling the further processing of data from the input device, such that the notification is provided at substantial the same time as the disabling the further processing of the data, shortly before the disabling the further processing of the data, or shortly after disabling the further processing of the data.

18. A non-transitory computer readable medium configured to limit input from an input device of an electronic device, the non-transitory computer readable medium comprising instructions which, upon execution by a processor of the electronic device, causes the processor to:
    generate data, at a sensor of the electronic device, indicative of an attitude of an electronic device;
    determine, at a processor of the electronic device, that the data indicative of the attitude is not less than a predetermined attitude criteria for a predetermined period of time;
    disable further processing of data received from an input device in response to the data indicative of the attitude is not less than the predetermined attitude criteria for the predetermined period of time; and
    provide a notification when disabling the further processing of the data, said notification signal indicating the further processing of data received from the input device is being disabled.

19. The non-transitory computer readable medium as recited in claim 18, wherein the instructions further cause the processor to determine that the data indicative of the attitude is not less than the predetermined attitude criteria comprises determining a bottom portion of the electronic device is positioned above a top portion of the electronic device, thereby detecting an upside down attitude.

20. The non-transitory computer readable medium as recited in claim 18, wherein the instructions further cause the processor to provide the notification proximate to the disabling the further processing of data from the input device, such that the notification is provided at substantial the same time as the disabling the further processing of the data, shortly before the disabling the further processing of the data, or shortly after disabling the further processing of the data.

* * * * *